United States Patent
Kotsusa

(10) Patent No.: US 7,250,002 B2
(45) Date of Patent: Jul. 31, 2007

(54) FLEXIBLE COUPLING

(75) Inventor: Takayoshi Kotsusa, Fujisawa (JP)

(73) Assignee: NOK Corporation, Tokyo (JP)

( * ) Notice: Subject to any disclaimer, the term of this patent is extended or adjusted under 35 U.S.C. 154(b) by 116 days.

(21) Appl. No.: 10/499,815

(22) PCT Filed: Dec. 12, 2002

(86) PCT No.: PCT/JP02/13011

§ 371 (c)(1),
(2), (4) Date: Jul. 1, 2004

(87) PCT Pub. No.: WO03/064878

PCT Pub. Date: Aug. 7, 2003

(65) Prior Publication Data

US 2005/0075173 A1    Apr. 7, 2005

(30) Foreign Application Priority Data

Jan. 25, 2002  (JP) .............................. 2002-016595

(51) Int. Cl.
*F16D 3/62* (2006.01)
(52) U.S. Cl. .......................................... 464/69; 464/93
(58) Field of Classification Search .................. 464/69, 464/93–95
See application file for complete search history.

(56) References Cited

U.S. PATENT DOCUMENTS 4,182,139 A  *  1/1980  Hornig et al. ............ 464/69 X
6,315,670 B1 *  11/2001  Andra et al. ................. 464/69
2002/0037992 A1 *  3/2002  Niwa et al.

FOREIGN PATENT DOCUMENTS

| JP | 63-34325 A | * | 2/1988 | .................. 464/69 |
| JP | 64-27532 | | 2/1989 | |
| JP | 3-73724 | | 7/1991 | |
| JP | 5-14650 | | 2/1993 | |
| JP | 7-52427 | | 11/1995 | |
| JP | 11-325101 | | 11/1999 | |
| JP | 2001-124104 | | 5/2001 | |

* cited by examiner

Primary Examiner—Greg Binda
(74) Attorney, Agent, or Firm—Jacobson Holman PLLC

(57) ABSTRACT

A flexible coupling is provided with a plurality of drive side connection elements (10A) and driven side connection elements (10B) arranged alternately in a circumferential direction, a drive side bobbin (11A) and a driven side bobbin (11B) outward inserted to the respective connection elements (10A, 10B) in a loose fit state, first and second connection bands (20, 30) wound in a loop shape around the drive side bobbin (11A) and the adjacent driven side bobbin (11B), and alternately arranged in the circumferential direction, and an annular elastic body (40) formed in a state that the bobbins (11A, 11B) and the connection bands (20, 30) are buried, the bobbins (11A, 11B) being made of a synthetic resin material, and a lubricant being filled in a fitting gap (G) between the connection elements (10A, 10B) and the bobbins (11A, 11B).

4 Claims, 8 Drawing Sheets

Prior Art

Embodiment of Present Invention

TECHNICAL FIELD

The present invention relates to a flexible coupling which elastically connects between shaft ends of a drive side rotation shaft and a driven side rotation shaft so as to transmit a rotation torque, and absorbs a vibration and a deflection in an axial direction between both the shafts, and more particularly to a flexible coupling having a structure in which a bobbin mounted to the drive side rotation shaft side and a bobbin mounted to the driven side rotation shaft side are connected via a loop-shaped connection band.

BACKGROUND ART

FIG. 7 is a cross sectional view showing a typical prior art of this kind of flexible coupling 100 by cutting along a plane orthogonal to an axis thereof, and FIG. 8 is a cross sectional view along a line VIII-VIII in FIG. 7. In other words, the flexible coupling 100 shown in FIGS. 7 and 8 is structured such that a plurality of and an equal number of drive side connection elements 101 and driven side connection elements 102 are alternately arranged in a circumferential direction, the drive side connection element 101 and the driven side connection element 102 which are adjacent in the circumferential direction are connected by first and second connection bands 105, 106 which are wound in a loop shape around a drive side bobbin 103 and a driven side bobbin 104 respectively attached to outer peripheries thereof and are formed by winding a cord such as a polyester or the like having a suitable tensional elasticity in a multilayer shape, and the bobbins 103, 104 and the connection bands 105, 106 are integrally buried in an annular elastic body 107 made of rubber or the like.

Each of the driven side and driven side bobbins 103, 104 is constituted by a steel sleeve 108 and a pair of steel collars 109 which are pressure inserted and fixed to an outer periphery of the sleeve 108 at a predetermined interval in an axial direction. Each of the collars 109, 109 is press molded in an approximately C cross sectional shape having an annular collar portion in both sides in an axial direction.

The first connection band 105 is wound around a portion between the collars 109, 109 in the outer peripheral surface of the sleeve 108 of the drive side bobbin 103, and around a portion between the collars 109, 109 in the outer peripheral surface of the sleeve 108 of the driven side bobbin 104, and the second connection bands 106, 106 adjacent thereto in the circumferential direction are wound around the collars 109, 109 of the drive side bobbin 103 and around the collars 109, 109 of the driven side bobbin 104, respectively. In other words, each of the drive side connection elements 101 and each of the driven side connection elements 102 which are alternately arranged at a uniform interval in the circumferential direction are connected alternately in the circumferential direction by a bundle of first connection band 105 and two bundles of second connection bands 106, 106.

The flexible coupling 100 is structured such that the drive side connection element 101 in the inner periphery of the drive side bobbin 103 is mounted to a yoke in an axial end of a drive side rotation shaft via bolts and nuts (not shown) arranged at a uniform interval in a circumferential direction, and the driven side connection element 102 in the inner periphery of the driven side bobbin 104 is mounted to a yoke in an axial end of a driven side rotation shaft via bolts and nuts (not shown) arranged at a uniform interval in a circumferential direction. Accordingly, it is possible to transmit a rotation torque of the drive side rotation shaft to the driven side rotation shaft, it is possible to allow a rotation transmission in a connection state in which axial directions of the drive side rotation shaft and the driven side rotation shaft are different (a pinch state), and an axial relative displacement of both the rotation shafts on the basis of a deforming characteristic of the first and second connection bands 105, 106 and the annular elastic body 107, and it is possible to absorb a vibration transmitting between both the rotation shafts.

In this kind of flexible coupling 100, the first and second connection bands 105, 106 extend in parallel in an inner peripheral side and an outer peripheral side in the annular elastic body 107 between the bobbins 103, 104. Accordingly, in the case that a relative torsional displacement in a circumferential direction is generated between the drive side bobbin 103 and the driven side bobbin 104 which are adjacent in the circumferential direction, on the basis of an input of the transmission torque, the first connection band 105 or the second connection band 106 are enlarged more largely in portions 105a, 106a extending in an outer peripheral side (hereinafter referred to as an outer peripheral side portion) in comparison with portions 105b, 106b extending in an inner peripheral side (hereinafter referred to as an inner peripheral side portion) within the annular elastic body 107, whereby an elastic force difference is generated.

However, since the first and second connection bands 105, 106 constituted by the polyester cord or the like is hard to slip with respect to the steel bobbins 103, 104 (the sleeve 108 and the collar 109), the elastic force difference between the inner peripheral side portions 105b, 106b, and the outer peripheral side portions 105a, 106a is hard to be cancelled. Accordingly, the tensional force difference is increased in accordance with an increase of the torsional displacement between the drive side bobbin 103 and the driven side bobbin 104. Further, since the torsional torque is applied to the outer peripheral side portions 105a, 106a in the first connection band 105 or the second connection band 106 in a biased manner, under this state, a tensile stress and a strain of the outer peripheral side portions 105a, 106a are increased, whereby a torsion angle is further increased, so that there is a risk that the first and second connection bands 105 and 106 are broken early by fatigue.

Further, in this kind of flexible coupling 100, if a suitable initial slack is applied to the first and second connection bands 105, 106, a torsional rigidity can be maintained small until the slack of the first connection band 105 or the second connection band 106 is cancelled between the drive side bobbin 103 and the driven side bobbin 104 at a time of inputting the torque. Accordingly, it is possible to achieve an excellent vibration absorbing effect, and it is possible to achieve a two-stage characteristic that the torsional rigidity is increased at a time when the first connection band 105 or the second connection band 106 is enlarged linearly, and a great torque transmission force is generated. However, if the slip between the first and second connection bands 105, 106, and the drive side bobbin 103 and the driven side bobbin 104 is hard to be generated, the initial slack of the outer peripheral side portions 105a, 106a and the inner peripheral side portions 105b, 106b in the first and second connection bands 105, 106 is uneven, and it is hard to secure a stable two-stage characteristic.

Further, the drive side bobbin 103 and the driven side bobbin 104 are manufactured by pressure inserting the collar 109 obtained by press molding a steel plate into the outer peripheral surface of the sleeve 108 which is formed by drawing a steel pipe and is chamfered in inner peripheral portions of both end surfaces in accordance with a cutting process. The chamfer of the sleeve 108 is formed for the purpose of making it easy to pressure insert the sleeve 108 to the outer periphery of the drive side connection element 101 or the driven side connection element 102. However, the bobbins 103, 104 manufactured in the manner mentioned above require a drawing process of the steel pipe and a chamfering process by cutting the inner peripheral portions of both end surfaces, at a time of manufacturing the sleeve 108, and a working process for manufacturing the collar 109 having the collar portions in both ends in the axial direction is troublesome. Accordingly, there is a problem that a manufacturing cost is high.

The present invention is made by taking the problems mentioned above into consideration, and a technical object of the present invention is to prevent a connection band from being broken early so as to improve a fatigue resistance, secure a two-stage characteristic of a vibration absorbing performance at an initial time of inputting a torque, and a shock absorbing performance and a torque transmission force, and provide the structure at a low cost.

DISCLOSURE OF THE INVENTION

As a means for effectively achieving the technical object mentioned above, in accordance with a first aspect of the present invention, there is provided a flexible coupling comprising a plurality of drive side connection elements, driven side connection elements, bobbins, a first and a second connection bands, and an annular elastic body. The plurality of drive side connection elements and driven side connection elements are arranged alternately in a circumferential direction. The bobbins are outward inserted to the respective connection elements in a come-off prevention state. The first and second connection bands are wound in a loop shape around and in direct contact with the bobbin in an outer periphery of the drive side connection element and the bobbin in an outer periphery of the driven side connection element which is adjacent in a circumferential direction, those connection bands being alternately arranged in the circumferential direction. The annular elastic body is formed in a state in which the bobbins and the first and second connection bands are buried, and formed continuously in the circumferential direction. In addition, the bobbins are made of a synthetic resin material. In accordance with this structure, it is possible to lower a friction coefficient with the first and second connection bands.

Further, in accordance with a second aspect of the present invention, there is provided a flexible coupling as recited in the first aspect, wherein the bobbin is loose fitted to each of the connection elements. In accordance with this structure, it is possible to rotate the bobbin with respect to each of the connection elements.

Further, in accordance with a third aspect of the present invention, there is provided a flexible coupling as recited in the second aspect, wherein a lubricant is interposed between the drive side connection element or the driven side connection element and the bobbin. In accordance with this structure, it is possible to more easily rotate the bobbin with respect to each of the connection elements.

BEST MODE FOR CARRYING OUT THE INVENTION

Figure 1:
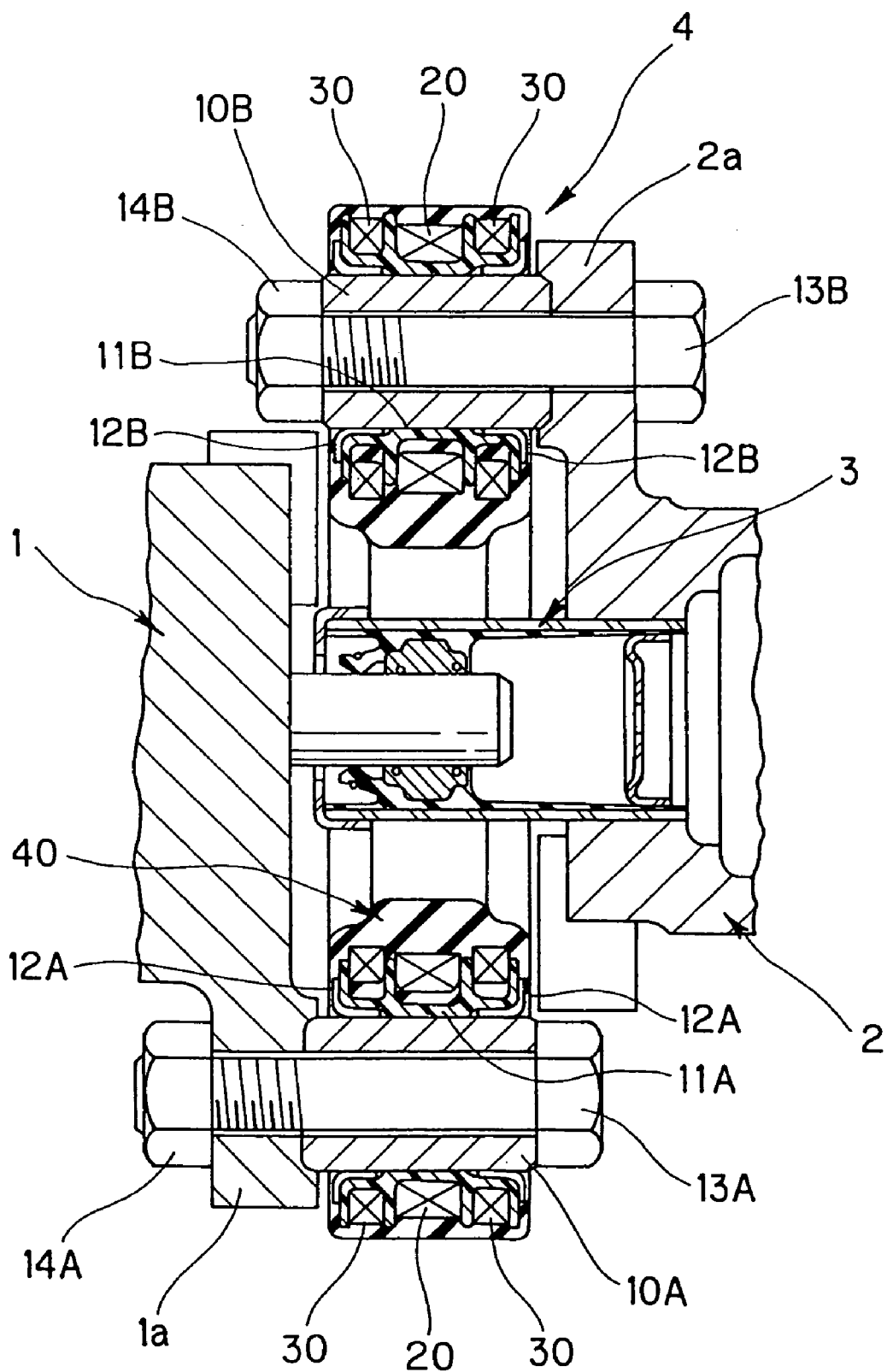
FIG. 1 is a cross sectional view showing a state in which a drive side rotation shaft 1 and a driven side rotation shaft 2 in a propeller shaft of a motor vehicle or the like are connected via a flexible coupling 4 in accordance with the present invention, by cutting along a plane passing through an axis.
Figure 2:
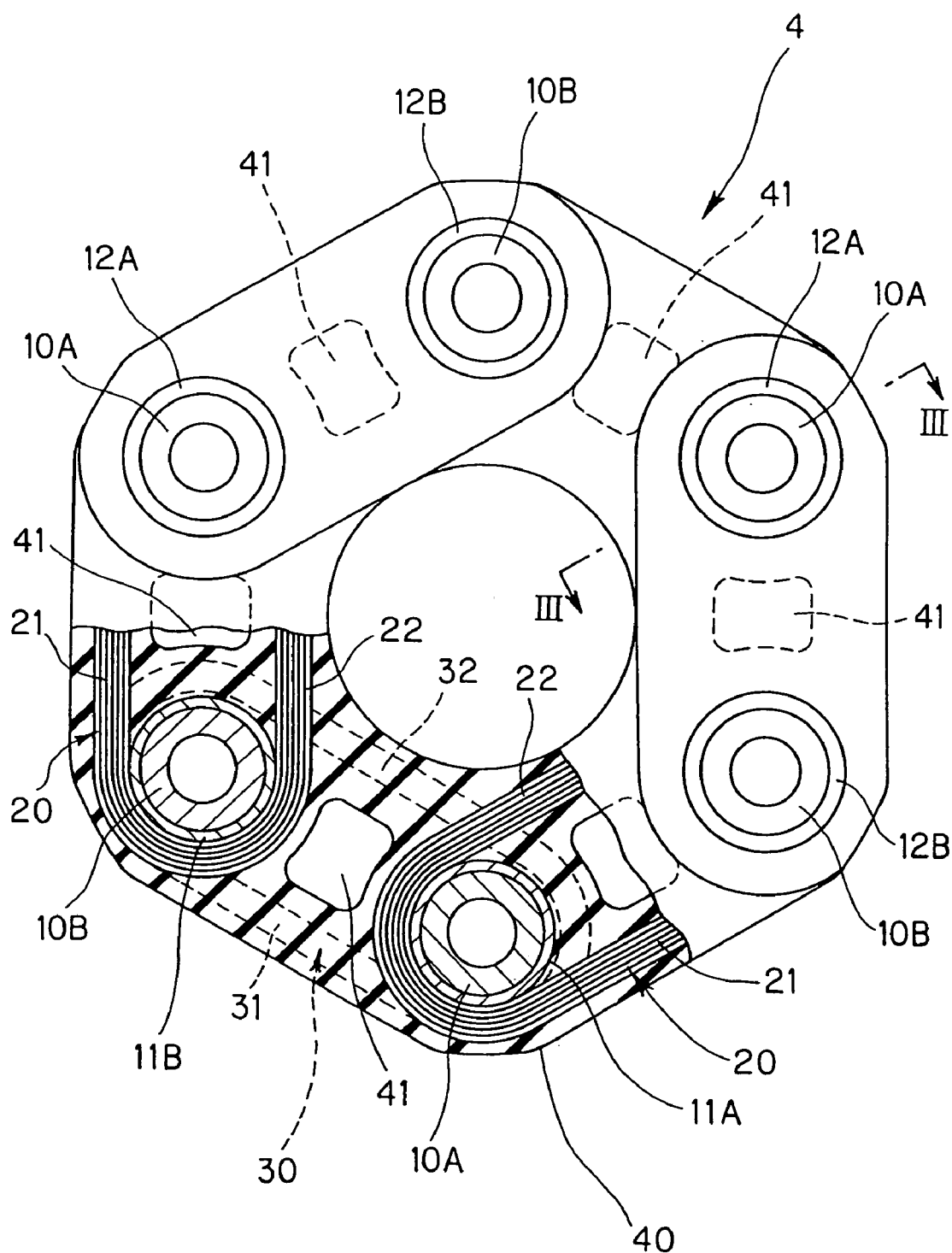
FIG. 2 is a cross sectional view showing a preferable embodiment of the flexible coupling 4 in accordance with the present invention, by cutting along a plane orthogonal to the axis.
Figure 3:
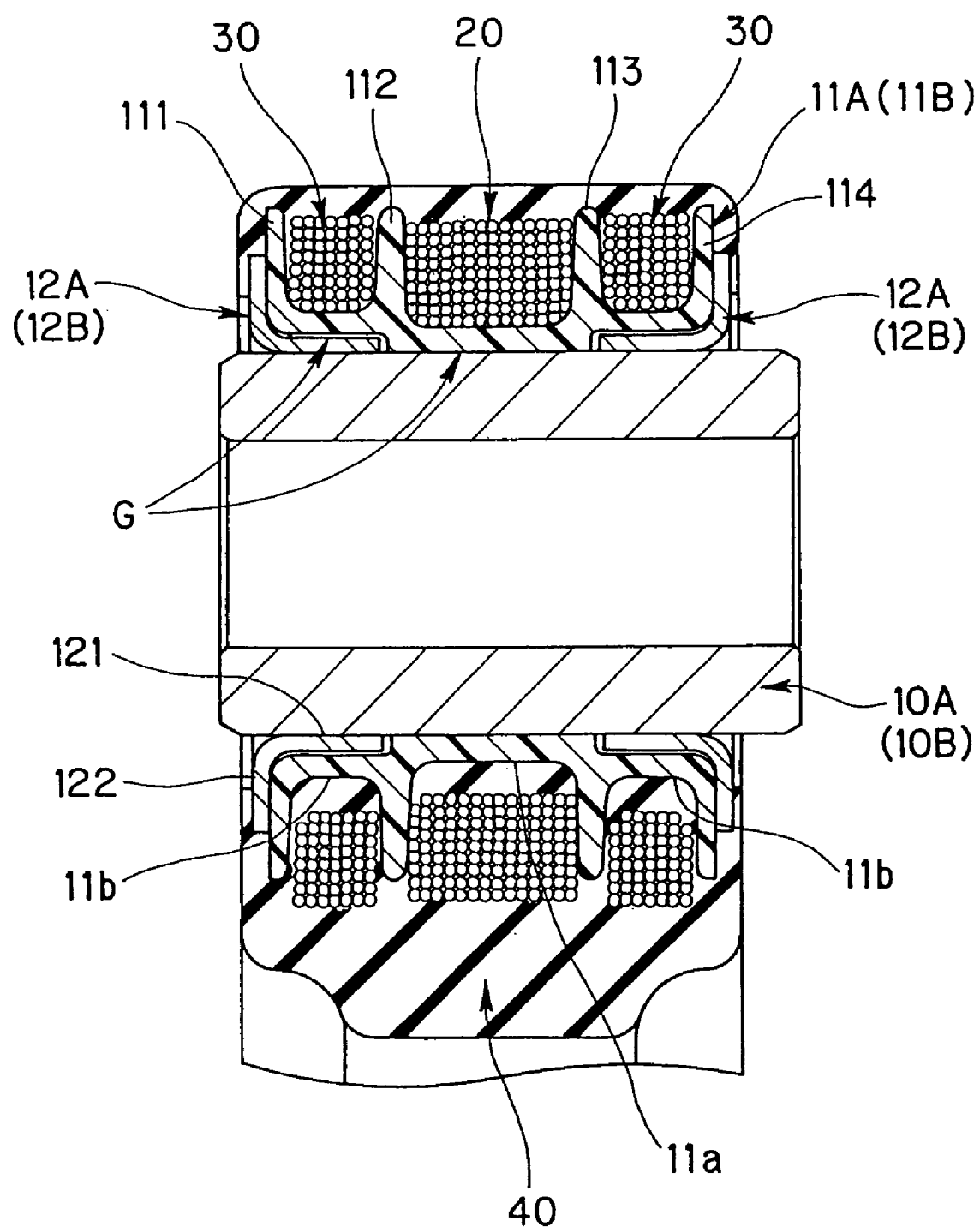
FIG. 3 is a cross sectional view showing by cutting along a line III-III in FIG. 2.
Figure 4:
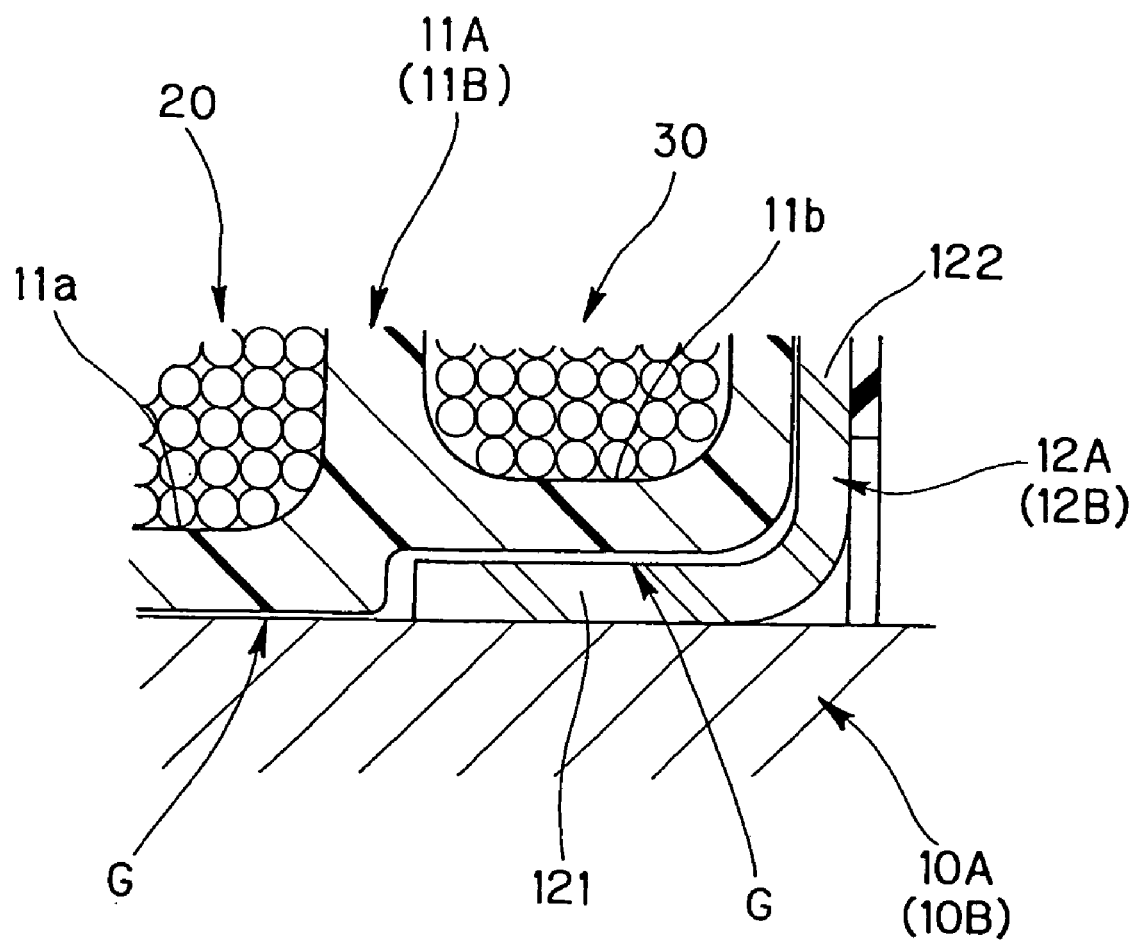
FIG. 4 is a partly cross sectional view showing a part in FIG. 3 in an enlarged manner.

FIG. 1 is a cross sectional view showing a state in which a drive side rotation shaft and a driven side rotation shaft in a propeller shaft of a motor vehicle or the like are connected via a flexible coupling in accordance with the present invention, by cutting along a plane passing through an axis, FIG. 2 is a cross sectional view showing the flexible coupling in accordance with the present invention, by cutting along a plane orthogonal to the axis, FIG. 3 is a cross sectional view showing by cutting along a line III-III in FIG. 2, and FIG. 4 is a cross sectional view showing a part in FIG. 3 in an enlarged manner. In the following description, "circumferential direction" is a circumferential direction around an axis of the flexible coupling.

First, in FIG. 1, reference numeral 1 denotes a drive side rotation shaft, reference numeral 2 denotes a driven side rotation shaft, and reference numeral 3 denotes a centering bush for holding mutual centering of the drive side rotation shaft 1 and the driven side rotation shaft 2. Opposing axial ends of the drive side rotation shaft 1 and the driven side rotation shaft 2 are connected to each other via a flexible coupling 4 in accordance with the present invention.

The flexible coupling 4 is provided with three cylindrical drive side connection elements 10A which are arranged at an interval of 120 degree in a circumferential direction, and three cylindrical driven side connection elements 10B which are arranged at respective intermediate positions between the drive side connection elements 10A, that is, at 60 degree different phase from the drive side connection elements 10A, and at an interval of 120 degree in the circumferential direction, as shown in FIG. 2. The drive side connection elements 10A and the driven side connection elements 10B are arranged such that axes thereof are parallel to an axis of the flexible coupling 4, as shown in FIGS. 1 and 3.

A drive side bobbin 11A and a pair of collars 12A for preventing the drive side bobbin 11A from coming off are outward inserted to an outer periphery of each of the drive side connection elements 10A, and in the same manner, a driven side bobbin 11B and a pair of collars 12B for preventing the drive side bobbin 11B from coming off are outward inserted to an outer periphery of each of the driven side connection elements 10B. As shown in FIG. 1, the drive side connection element 10A is mounted to a yoke 1a in an axial end of the drive side rotation shaft 1 at the interval of 120 degree in the circumferential direction, by a bolt 13A inserted to the drive side connection element 10A and a nut 14A screwed therewith, and the driven side connection element 10B is mounted to a yoke 2a in an axial end of the driven side rotation shaft 2 at the interval of 120 degree in the circumferential direction, by a bolt 13B inserted to the driven side connection element 10B and a nut 14B screwed therewith.

A drive side bobbin 11A and a driven side bobbin 11B which are adjacent to each other in the circumferential direction are alternately connected to each other via first and second connection bands 20, 30. Further, each of the bobbins 11A, 11B and each of the connection bands 20, 30 are buried in an annular elastic body 40 formed by an elastomer material such as a rubber or the like. In other words, the annular elastic body 40 is formed by setting each of the bobbins 11A, 11B within a metal mold in a state of connecting the bobbins 11A, 11B via each of the connection bands 20, 30, and filling a molding elastomer material into the metal mold and vulcanizing the molding elastomer material.

The drive side connection element 10A and the driven side connection element 10B are identical, and are manufactured by cutting a carbon steel pipe or the like. Further, the drive side bobbin 11A and the driven side bobbin 11B are identical, and are formed by a synthetic resin, preferably a nylon N66. Accordingly, it is possible to manufacture at a low cost by using a resin molding metal mold.

The drive side bobbin 11A and the driven side bobbin 11B are formed in a shape having four collar portions 111, 112, 113, 114 at a predetermined interval in an axial direction, as is most clearly shown in FIG. 3. A first winding portion 11a around which the first connection band 20 is wound is formed between the inner collar portions 112, 113, and a second winding portion 11b around which the second connection band 30 is wound is formed between the inner collar portion 112 and the outer collar portion 111 and between the other inner collar portion 113 and the outer collar portion 114. The first winding portion 11a is formed wider than the second winding portion 11b.

The collars 12A, 12B are identical, are made of a steel plate such as SPCC or the like, and are formed approximately in an L-shaped cross section comprising a cylinder portion 121 and a collar portion 122. The collars 12A, 12B having the shape mentioned above can be easily manufactured in accordance with a punching press or the like, as is different from the collar having the collar portions in both sides in the axial direction such as the collar 109 of the conventional flexible coupling 100 shown in FIG. 8 which is previously described, and it is unnecessary to manufacture the sleeve 108 in accordance with the drawing process of the steel pipe and the chamfering process of the inner peripheries of both ends. Accordingly, this contributes to reduction in the manufacturing cost.

As shown in FIG. 4 in an enlarged manner, the cylinder portion 121 in the collars 12A, 12B is arranged in an inner peripheral side of the second winding portions 11b, 11b in the drive side bobbin 11A or the driven side bobbin 11B, and is pressure inserted and fitted to the outer peripheral surface of the drive side connection element 10A or the driven side connection element 10B at a suitable fastening margin.

The drive side bobbin 11A and the driven side bobbin 11B are loose fitted to the outer peripheral surfaces of the drive side connection element 10A and the driven side connection element 10B, and are in a loose fitted state with respect to the collars 12A, 12B. A lubricating oil (a grease or the like) is filled in a fitting gap G.

The first connection band 20 and the second connection band 30 are arranged alternately in the circumferential direction. In detail, the first connection band 20 is arranged at three positions in the circumferential direction at a phase interval of 120 degree one bundle by one bundle, and is wound in a loop shape around the first winding portion 11a in the driven side bobbin 11B and the first winding portion 11a of the drive side bobbin 11A adjacent to the driven side bobbin 11B in the circumferential direction. The second connection band 30 is arranged at three positions in the circumferential direction at a phase interval which is 60 degree different from the first connection band 20 two bundles by two bundles, and is wound in a loop shape around a pair of second winding portions 11b in the drive side bobbin 11A and a pair of second winding portions 11b in the driven side bobbin 11B adjacent to the drive side bobbin 11A in the circumferential direction. In other words, each of the drive side bobbins 1A and each of the driven side bobbins 11B are arranged alternately in the circumferential direction at the phase interval of 60 degree with each other, and are connected alternately in the circumferential direction by one bundle of the first connection band 20 and two bundles of the second connection bands 30, 30.

The first and second connection bands 20, 30 are formed by winding a cord made of a high polymer material having a desired tensile elasticity, for example, a polyester or the like, in a multilayer shape. As a specific example, the first connection band 20 is formed by winding a cord of 3000 denier made of polyethylene terephthalate (PET), for example, at about 20 turns, and each of the second connection bands 30 in both sides in the axial direction is formed by winding a cord of 3000 denier made of PET at about 144 turns in the same manner.

The annular elastic body 40 is formed by a rubber elastic material such as natural rubber or the like, in such a manner as to wrap a periphery of each of the drive side bobbins 11A and each of the driven side bobbins 11B and a periphery of the first and second connection bands 20, 30 extending between the bobbins, and a hole portion 41 positioned in the middle of each of the drive side bobbins 11A and each of the driven side bobbins 11B and open to one side in the axial direction is formed. The hole portion 41 is structured such as to prevent a crack due to a compression of the annular elastic body 40 from being generated between the bobbins, on the basis of a relative displacement of the drive side bobbin 11A and the driven side bobbin 11B in accordance with the torsional input to the flexible coupling 4.

The flexible coupling 4 in accordance with the present invention is interposed between the drive side rotation shaft 1 and the driven side rotation shaft 2 as shown in FIG. 1 which is previously described, transmits the rotation torque of the drive side rotation shaft 1 to the driven side rotation shaft 2 via the first and second connection bands 20, 30, allows the rotation transmission in a pinch state in which the directions of the axes of the drive side rotation shaft 1 and the driven side rotation shaft 2 are different, and the relative displacement of both the rotation shafts 1, 2 in the axial direction, on the basis of the deforming characteristic of the first and second connection bands 20, 30 and the annular elastic body 40, and absorbs the transmission vibration between both the rotation shafts 1, 2.

In the case that the interval between the drive side bobbin 11A and the driven side bobbin 11B is relatively changed, for example, in a direction of applying the tension to the first connection band 20, on the basis of the input of the torsion torque in accordance with the rotation transmission, when a tensile force of a portion (hereinafter, refer to as an outer peripheral side portion) 21 biasedly existing relatively in an outer peripheral side within the annular elastic body 40 in each of the first connection band 20 becomes larger than a tensile force of a portion (hereinafter, refer to as an inner peripheral side portion) 22 biasedly existing in an inner peripheral side, each of the bobbins 1A, 11B rotates in a direction of canceling the tensile force difference on the basis of the tensile force difference, with respect to the outer peripheral surface of the drive side connection element 10A or the driven side connection element 10B, or generates a slip in the direction of canceling the tensile force difference, with respect to the first connection band 20. This is because each of the bobbins 11A, 11B is made of the synthetic resin material, whereby the friction coefficient with the first connection band 20 is low, and is in a state capable of rotating with the connection elements 10A, 10B and the collars 12A, 12B at a low friction due to a loose fit.

Accordingly, the inner peripheral side portion 22 and the outer peripheral side portion 21 in the first connection band 20 are exposed to an approximately equal tensile stress to each other, and the tensile stress is not concentrated to the outer peripheral side portion 21, whereby it is possible to prevent the tensile strength from being lowered.

The same matter is applied to the case that the interval between the drive side bobbin 11A and the driven side bobbin 11B is relatively changed, for example, in a direction of applying the tension to the second connection band 30. Since the tensile stresses applied to the inner peripheral side portion 32 and the outer peripheral side portion 31 become approximately equal to each other on the basis of the rotation of the drive side bobbin 11A and the driven side bobbin 11B with respect to the drive side connection element 10A and the driven side connection element 10B, or the slip of the second connection band 30 with respect to the drive side bobbin 11A and the driven side bobbin 11B, it is possible to prevent the tensile strength from being lowered due to the concentration of the tensile stress to the outer peripheral side portion 31.

In particular, in the case that a lubricating oil is filled in a fitting gap G shown in FIGS. 3 and 4, the tensile force difference between the outer peripheral side portions 21, 31 and the inner peripheral side portions 22, 32 of the first connection band 20 and the second connection band 30 at a time of inputting the torque is cancelled on the basis of the rotation of the drive side bobbin 11A and the driven side bobbin 11B. Accordingly, since the drive side bobbin 11A and the driven side bobbin 11B are lubricated, no wear is generated.

Further, since the initial slack of the outer peripheral side portions 21, 31 and the inner peripheral side portions 22, 32 in the first and second connection bands 20, 30 becomes uniform on the basis of the rotation of the bobbin 11A and the bobbin 11B or the slip with the first and second connection bands 20, 30 as mentioned above, it is possible to achieve a good two-stage characteristic such as a vibration absorbing and damping effect on the basis of the initial slack, and a great torque transmission force in a state in which the initial slack is cancelled.

Figure 5:
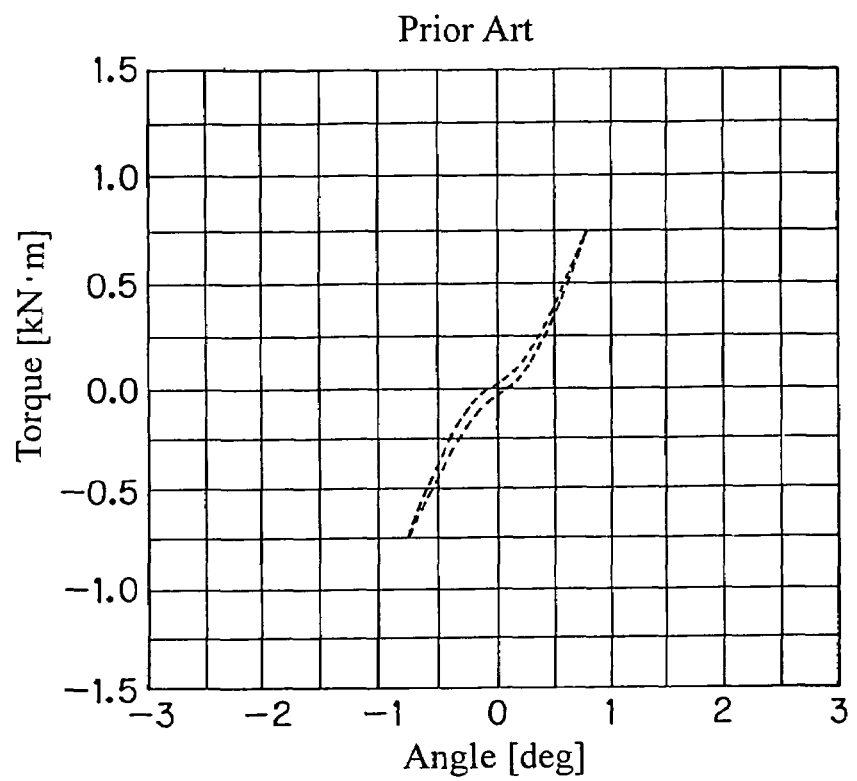
FIG. 5 is a characteristic graph showing torsion spring characteristics of the flexible coupling 4 in accordance with the present invention and the flexible coupling in accordance with the conventional structure by comparison.
Figure 5:
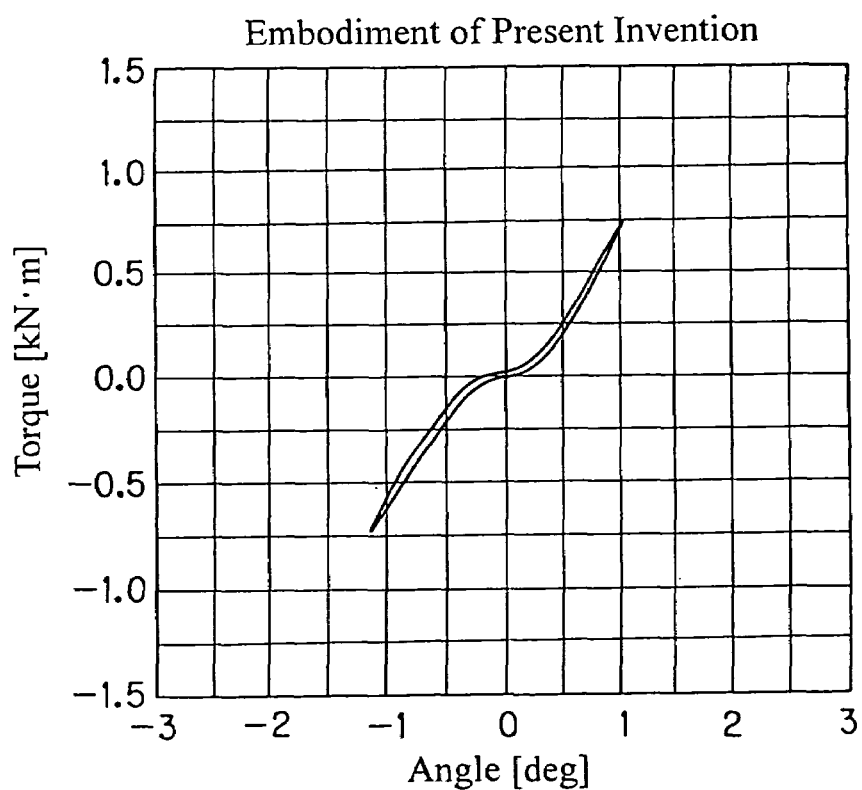
Figure 7:
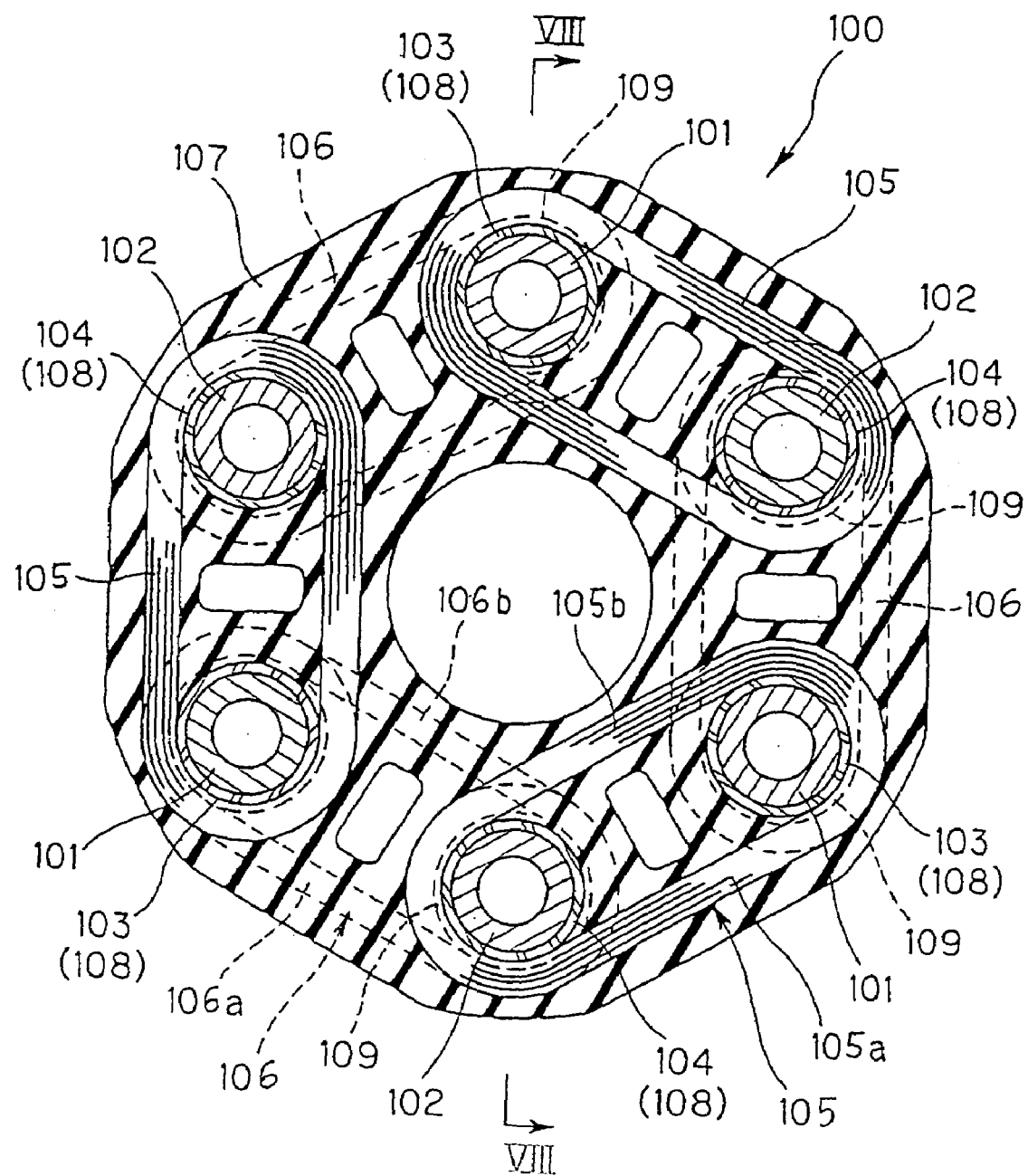
FIG. 7 is a cross sectional view showing the flexible coupling 100 in accordance with the prior art by cutting along a plane orthogonal to an axis thereof.
Figure 8:
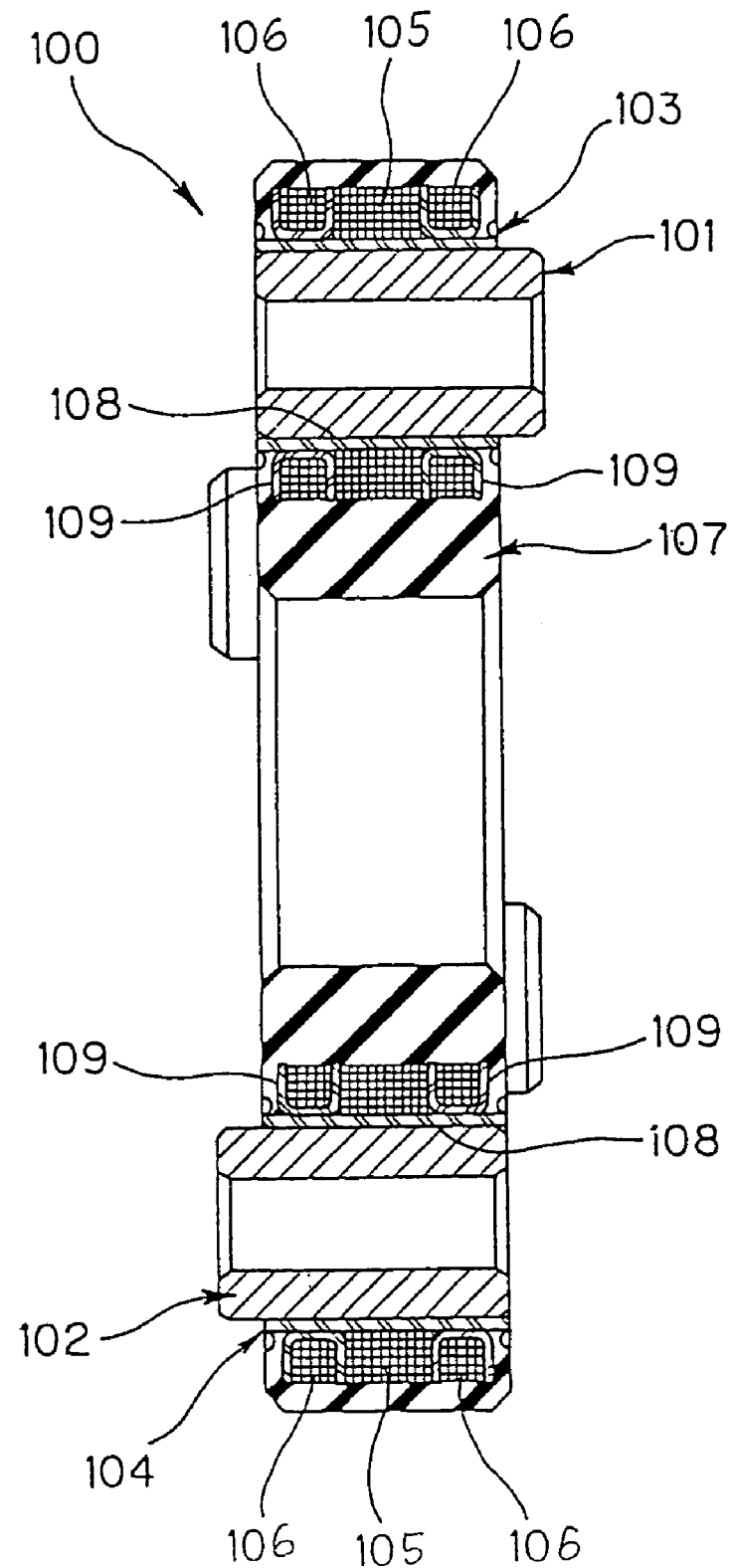
FIG. 8 is a cross sectional view along a line VIII-VIII in FIG. 7.

FIG. 5 shows torsion spring characteristics of the flexible coupling 4 in accordance with the present embodiment and the flexible coupling 100 in accordance with the conventional structure shown in FIGS. 7 and 8 by comparison. As shown in this graph, in accordance with the flexible coupling 4 of the present embodiment, the vibration absorbing and damping area of the low spring constant is remarkable in comparison with the conventional one, and an excellent two-stage characteristic can be achieved. Further, in the flexible coupling 4 in accordance with the present embodiment, for example, a static spring constant in a state in which the initial slack is cancelled comes to about 1000 N·m/deg with respect to the torsion direction, comes to about 22 N·m/deg with respect to the pinching direction, and comes to about 260 N·m/deg with respect to the axial direction.

Figure 6:
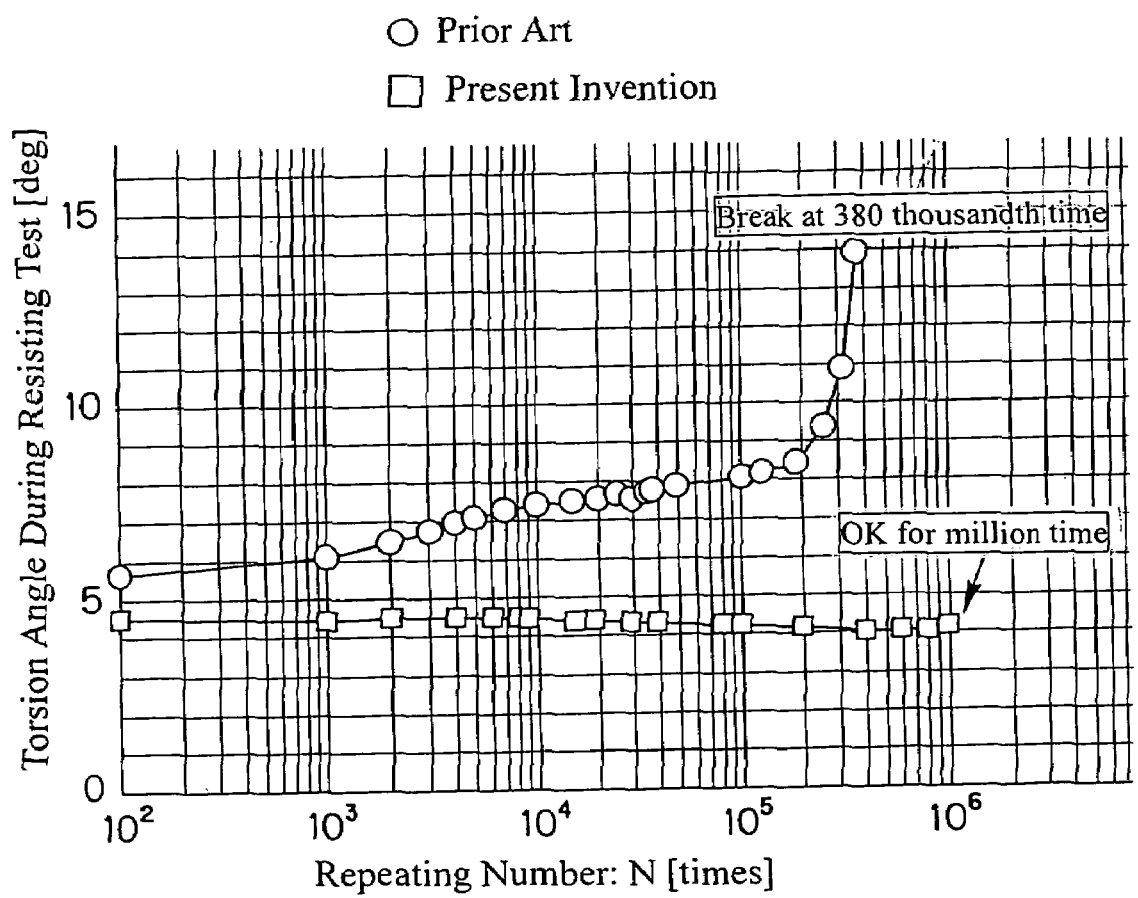
FIG. 6 is a schematic view showing results obtained by applying a fatigue resisting test to the flexible coupling 4 in accordance with the present invention, and the flexible coupling 100 in accordance with the conventional structure.

FIG. 6 shows results obtained by applying a fatigue resisting test to the flexible coupling 4 in accordance with the embodiment of the present invention, and the flexible coupling 100 in accordance with the conventional structure shown in FIGS. 7 and 8. The fatigue resisting test is performed by applying a fixed repeated load torque at an exciting frequency 1 Hz and executing $10^6$ times of excitations.

As is apparent from FIG. 6, in this fatigue resisting test, in the structure in accordance with the prior art, the torsion angle is gradually increased in accordance with an increase of the number of excitation, an increasing rate of the torsion angle is gradually increased in the case that the number of excitation is more than $2 \times 10^5$, and the structure reaches fatigue breakage at a time when the number of excitation is about $3.8 \times 10^5$. On the contrary, in the structure in accordance with the present invention, the increase of the torsion angle does not appear, and the structure does not reach breakage even when the number of excitation reaches $10^5$, and the test is finished.

INDUSTRIAL APPLICABILITY

In accordance with the flexible coupling on the basis of the first aspect of the present invention, since the bobbins outward inserted to the drive side connection element and the driven side connection element are made of the synthetic resin material, it is possible to cancel the elastic force difference generated between the inner peripheral side portion and the outer peripheral side portion being parallel to each other of the connection band, at a time when the portion between the drive side bobbin and the driven side bobbin being adjacent to each other in the circumferential direction are relatively displaced in the circumferential direction, on the basis of the slip with respect to the bobbin. Accordingly, it is possible to prevent the torsion torque from being applied biasedly to the outer peripheral side portion of the connection band, and it is possible to improve a durability. Further, since it is easy to set a stable initial slack, it is possible to obtain an excellent vibration absorbing and damping effect at a time of inputting the initial torque, and an excellent torque transmitting force caused by the increase of the spring constant after the initial slack is cancelled. Further, since the bobbin is made of the synthetic resin material, it is possible to reduce the manufacturing cost so as to provide an inexpensive structure.

In accordance with the flexible coupling on the basis of the second aspect of the present invention, since the bobbin is loose fitted to each of the connection elements, in the structure described in the first aspect, the tension difference between the inner peripheral side portion and the outer peripheral side portion of the connection band is securely cancelled by the rotation of the bobbin with respect to the connection element, and it is possible to more securely obtain the effect obtained by the first aspect.

In accordance with the flexible coupling on the basis of the third aspect of the present invention, the lubricant is interposed between the drive side connection element or the driven side connection element and the bobbin, in the structure described in the second aspect, the tension difference between the inner peripheral side portion and the outer peripheral side portion of the connection band is securely cancelled by the rotation of the bobbin with respect to the connection element, and it is possible to prevent the bobbin from being worn.

What is claimed is:

1. A flexible coupling comprising:
   a plurality of drive side connection elements and driven side connection elements arranged alternately in a circumferential direction;
   bobbins outward inserted to the respective connection elements in a come-off prevention state;
   first and second connection bands wound in a loop shape around and in direct contact with the bobbin in an outer periphery of said drive side connection element and the bobbin in an outer periphery of the driven side connection element which is adjacent in a circumferential direction, the connection bands being alternately arranged in the circumferential direction;
   a pair of collars, each of which comprising a cylinder portion and a collar portion, being arranged between the bobbins and the drive side and driven side connection elements, and the cylinder portions being press fit to the outer periphery of the drive side connection elements and the outer periphery of the driven side connection element, respectively, and;
   an annular elastic body formed in a state in which said bobbins and the first and second connection bands are buried, and formed continuously in the circumferential direction,
   wherein said bobbins are made of a synthetic resin material and each bobbin is loose fitted to one of the respective connection elements.

2. The flexible coupling as claimed in claim 1, wherein a lubricant is interposed between the drive side connection element or the driven side connection element and the bobbin.

3. The flexible coupling as claimed in claim 1, wherein each of the pair of collars is in a substantially L-shape in a cross section that is parallel to its axis of the cylinder portion.

4. The flexible coupling as claimed in claim 3, wherein the pair of collars is made of metal.

* * * * *